United States Patent
Kaneko et al.

(10) Patent No.: US 12,084,058 B2
(45) Date of Patent: Sep. 10, 2024

(54) ELECTRIC VEHICLE CONTROL DEVICE, CONTROL METHOD, AND CONTROL SYSTEM

(71) Applicant: Hitachi Astemo, Ltd., Hitachinaka (JP)

(72) Inventors: Satoshi Kaneko, Hitachinaka (JP); Keisuke Suzuki, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 493 days.

(21) Appl. No.: 17/310,342

(22) PCT Filed: Nov. 28, 2019

(86) PCT No.: PCT/JP2019/046548
§ 371 (c)(1),
(2) Date: Jul. 28, 2021

(87) PCT Pub. No.: WO2020/158145
PCT Pub. Date: Aug. 6, 2020

(65) Prior Publication Data
US 2022/0063626 A1 Mar. 3, 2022

(30) Foreign Application Priority Data
Jan. 29, 2019 (JP) .................. 2019-012994

(51) Int. Cl.
*B60W 30/18* (2012.01)
*B60W 20/20* (2016.01)
(52) U.S. Cl.
CPC ...... *B60W 30/18127* (2013.01); *B60W 20/20* (2013.01); *B60W 2510/083* (2013.01); *B60W 2520/28* (2013.01)

(58) Field of Classification Search
CPC ..... B60W 30/18127; B60W 2510/083; B60W 2520/28; B60L 15/20; B60L 2240/423
See application file for complete search history.

(56) References Cited

U.S. PATENT DOCUMENTS

| | | | |
|---|---|---|---|
| 2011/0066342 A1 | 3/2011 | Ozaki | |
| 2015/0105951 A1* | 4/2015 | Yu | B60L 7/12 701/22 |
| 2015/0202988 A1* | 7/2015 | De Bossoreille | B60L 15/20 701/22 |
| 2016/0016469 A1 | 1/2016 | Yamada | |
| 2016/0214486 A1* | 7/2016 | Suzuki | B60L 50/52 |

(Continued)

FOREIGN PATENT DOCUMENTS

| | | |
|---|---|---|
| JP | 2004-11498 A | 1/2004 |
| JP | 2016-25683 A | 2/2016 |
| JP | 2017-165151 A | 9/2017 |

OTHER PUBLICATIONS

"Zhang, Fault Diagnosis and Fault Mitigation for Torque Safety of Drive-by-Wire Systems, Sep. 2018, IEEE, vol. 67" (Year: 2018).*

(Continued)

*Primary Examiner* — Maceeh Anwari
(74) *Attorney, Agent, or Firm* — Crowell & Moring LLP

(57) ABSTRACT

A control device, a control method, and a control system for an electric vehicle are configured to use both of one-pedal feedback control based on an acceleration and one-pedal feedback control based on a speed, to thereby decelerate a vehicle to stop.

11 Claims, 10 Drawing Sheets

(56) References Cited

U.S. PATENT DOCUMENTS

2017/0089274 A1* 3/2017 Kolhouse .............. F02D 11/105
2018/0326852 A1* 11/2018 Shiozawa ................ B60L 9/18

OTHER PUBLICATIONS

International Search Report (PCT/ISA/210) issued in PCT Application No. PCT/JP2019/046548 dated Feb. 4, 2020 with English translation (five (5) pages).
Japanese-language Written Opinion (PCT/ISA/237) issued in PCT Application No. PCT/JP2019/046548 dated Feb. 4, 2020 with English translation (eight (8) pages).
Extended European Search Report issued in European Application No. 19913699.5 dated Feb. 28, 2022 (13 pages).

* cited by examiner

ELECTRIC VEHICLE CONTROL DEVICE, CONTROL METHOD, AND CONTROL SYSTEM

TECHNICAL FIELD

The present invention relates to a control device, a control method, and a control system for an electric vehicle.

BACKGROUND ART

As a technology of this type, a technology described in Patent Literature 1 is disclosed. In Patent Literature 1, there is disclosed the technology of executing feedback control so that the acceleration of a vehicle matches a target acceleration, and holding a previous road gradient when the travel speed of the vehicle becomes equal to or lower than a predetermined value, thereby connecting the target acceleration based on the held road gradient.

CITATION LIST

Patent Literature

PTL 1: JP 2004-11498 A

SUMMARY OF INVENTION

Technical Problem

However, according to Patent Literature 1, the acceleration feedback control is still executed after the speed of the vehicle enters a low speed zone. In one-pedal feedback control involving decelerating a vehicle to stop only by a motor torque, when the acceleration feedback control is executed in the low speed zone for stopping the vehicle, the target acceleration itself is low, and hence it is difficult to follow the target value. Accordingly, there is a fear of being difficult to smoothly stop the vehicle.

Solution to Problem

An object of the present invention is to provide a control device, a control method, and a control system for an electric vehicle, with which being capable of providing an improved smooth stop of a vehicle in one-pedal feedback control involving decelerating the vehicle to stop only by a motor torque.

A control device, a control method, and a control system for an electric vehicle according to one embodiment of the present invention are configured to use both of one-pedal feedback control based on the acceleration and one-pedal feedback control based on the speed, to thereby decelerate the vehicle to stop.

Thus, according to the one embodiment of the present invention, a smooth stop of the vehicle can be achieved.

DESCRIPTION OF EMBODIMENTS

Figure 1:
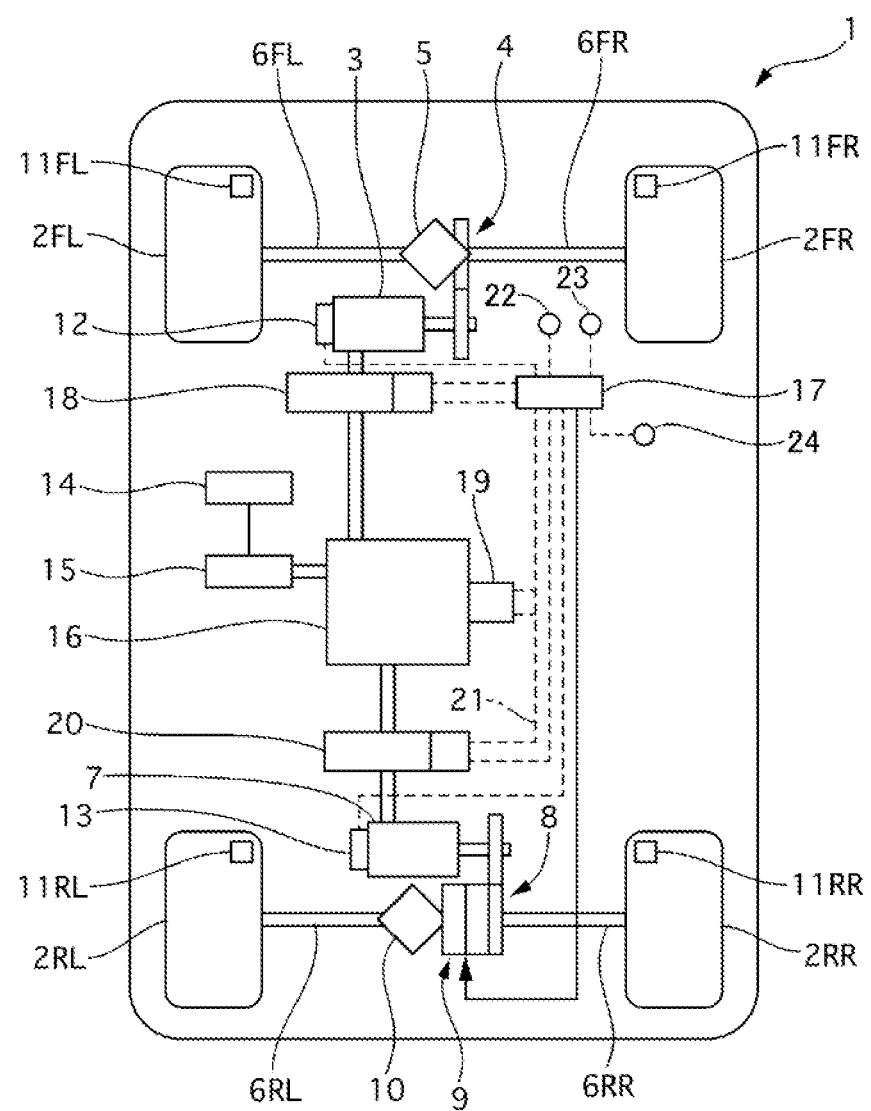
FIG. 1 is a configuration diagram of a control system for an electric vehicle according to a first embodiment of the present invention.

[First embodiment] FIG. 1 is a configuration diagram of a control system for an electric vehicle according to a first embodiment of the present invention.

An electric vehicle 1 includes a front motor (electric motor for front wheels) 3 configured to output torques to front wheels 2FL and 2FR. A power transmission between the front motor 3 and the front wheels 2FL and 2FR is executed through a speed reducer 4, a differential 5, and front axles 6FL and 6FR.

The electric vehicle 1 includes a rear motor (electric motor for rear wheels) 7 configured to output torques to front wheels 2RL and 2RR. A power transmission between the rear motor 7 and the rear wheels 2RL and 2RR is executed through a speed reducer 8, a dog clutch 9, a differential 10, and rear axles 6RL and 6RR.

When the dog clutch 9 is engaged, the power is transmitted between the rear motor and the rear wheels 2RL and 2RR.

Meanwhile, when the dog clutch 9 is disengaged, the power is not transmitted between the rear motor 7 and the rear wheels 2RL and 2RR.

The wheels 2FL, 2FR, 2RL, and 2RR include wheel speed sensors 11FL, 11FR, 11RL, and 11RR configured to detect wheel speeds, respectively. The front motor 3 includes a front wheel resolver 12 configured to detect the motor rotation number. The rear motor 7 includes a rear wheel resolver 13 configured to detect the motor rotation number.

The electric vehicle 1 includes a low-voltage battery 14 and a high-voltage battery 15. The low-voltage battery 14 is, for example, a lead storage battery. The high-voltage battery 15 is, for example, a lithium ion battery or a nickel-hydrogen battery. The high-voltage battery 15 is charged by power boosted by a DC-DC converter 16.

The electric vehicle 1 includes a vehicle control device 17, a front motor control device 18, a rear motor control device 20, and a battery control device 19. The respective control devices 17, 18, 19, and 20 mutually share information through a CAN bus 21.

The vehicle control device 17 acquires information from various types of sensor such as the front wheel resolver 12, the rear wheel resolver 13, an accelerator pedal sensor 22, a brake sensor 23, and a gear position sensor 24, to thereby execute integrated control for the vehicle. The vehicle control device 17 calculates a front requested torque to be output by the front motor 3 and a rear requested torque to be output by the rear motor 7 based on a requested distribution torque for a requested torque based on the accelerator operation by a driver and the like.

The requested distribution torque is a requested value of a torque distribution ratio between the front wheels 2FL and 2FR and the rear wheels 2RL and 2RR, and is appropriately set based on a travel state.

The front motor control device 18 controls power to be supplied to the front motor 3 based on the front requested torque. The rear motor control device 20 controls power to be supplied to the rear motor 7 based on the rear requested torque.

The battery control device 19 monitors a charge/discharge state of the high-voltage battery 15 and unit cells forming the high-voltage battery 15. The battery control device 19 calculates a battery requested torque limit value based on the charge/discharge state of the high-voltage battery 15 and the like. The battery requested torque limit value is the maximum torque allowed in the front motor 3 and the rear motor 7. For example, when a charging amount of the high-voltage battery 15 is becoming smaller, the battery requested torque limit value is to be set to a smaller value than a normal value.

Figure 2:
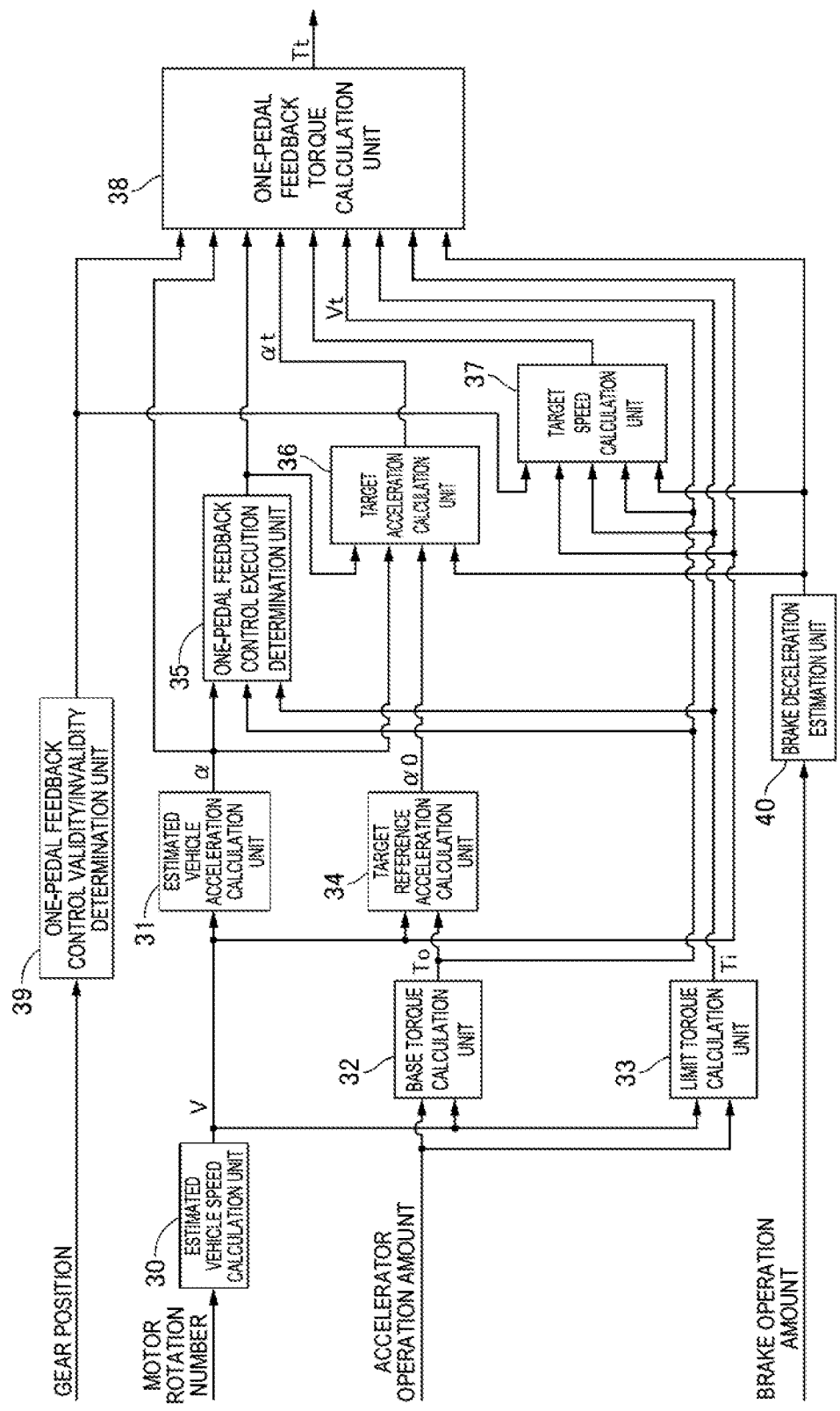
FIG. 2 is a block diagram for executing one-pedal feedback control by a vehicle control device 17 in the first embodiment.

FIG. 2 is a block diagram for execution of one-pedal feedback control by the vehicle control device 17 in the first embodiment.

The vehicle control device 17 includes an estimated vehicle speed calculation unit 30, an estimated vehicle acceleration calculation unit 31, a base torque calculation unit 32, a limit torque calculation unit 33, a target reference acceleration calculation unit 34, a one-pedal feedback control execution determination unit 35, a target acceleration calculation unit 36, a target speed calculation unit 37, a one-pedal feedback torque calculation unit (control unit) 38, a one-pedal feedback control validity/invalidity determination unit 39, and a brake deceleration estimation unit 40.

The estimated vehicle speed calculation unit 30 calculates an estimated speed V of the vehicle from the rotation number information on the electric motor 3 or 7 acquired from the front wheel resolver 12 or the rear wheel resolver 13.

The estimated vehicle acceleration calculation unit 31 calculates an acceleration α of the vehicle from the estimated speed V of the vehicle.

The base torque calculation unit 32 calculates, through a map defined in advance, a base torque To for each of the electric motors 3 and 7 being a reference of the one-pedal feedback control from accelerator pedal operation amount information on a release of the accelerator pedal acquired from the accelerator pedal sensor 22 configured to detect the stroke of the accelerator pedal and the estimated speed V of the vehicle.

The base torque To is uniquely determined by the speed V of the vehicle and the stroke of the accelerator pedal, and is set to a torque at which the vehicle stops on a flat road.

As a result, it is possible to more smoothly stop the vehicle also when the vehicle is to be stopped on a sloped road by adding a vehicle stop maintenance torque Ts obtained through the one-pedal feedback control to the base torque To as described below.

The limit torque calculation unit 33 calculates a limit torque Ti for the one-pedal feedback control from the accelerator pedal operation amount information on the release of the accelerator pedal acquired from the accelerator pedal sensor 22 configured to detect the stroke of the accelerator pedal and the estimated speed V of the vehicle.

The limit torque Ti is uniquely determined from the speed of the vehicle and the stroke of the accelerator pedal, and is set to the lowest value of the torque calculated by the one-pedal feedback torque calculation unit 38 described below.

As a result, durability of the front motor 3 and the rear motor 7 can be enhanced, and the limit torque Ti is changed toward the increasing direction based on the accelerator pedal operation so that the stopping vehicle can smoothly start and accelerate.

The target reference acceleration calculation unit 34 calculates an acceleration corresponding to the base torque To determined by the base torque calculation unit 32, to thereby determine a target reference acceleration no.

The target reference acceleration no becomes a value obtained by adding a deceleration corresponding to a braking force calculated by the brake deceleration estimation unit 40 when it is determined that a brake operation by the driver occurs based on information from a brake sensor 23 configured to detect a stroke or a pressing force of a brake pedal or a brake pressure.

As a result, also when the driver executes the brake operation, the vehicle can smoothly be stopped.

The one-pedal feedback control execution determination unit 35 determines whether or not the one-pedal feedback control is to be executed. A detailed description is given below.

The target acceleration calculation unit 36 changes the target reference acceleration no determined from the information on the acceleration α of the vehicle acquired from the estimated vehicle acceleration calculation unit 31, to thereby calculate a target acceleration αt.

The target speed calculation unit 37 determines to execute one-pedal feedback control based on the speed described below, to thereby calculate the target speed Vt based on the target acceleration αt when the one-pedal feedback control based on the speed starts.

As a result, it is possible to achieve a smooth stop of the vehicle based on a stable negative acceleration.

The one-pedal feedback torque calculation unit 38 adds, to the calculated base torque To, the vehicle stop maintenance torque Ts obtained from first torque information T1 (first command) in one-pedal feedback control based on the acceleration and second torque information (second command) in the one-pedal feedback control based on the speed, and calculates and outputs a one-pedal feedback torque (torque command) Tt.

That is, the one-pedal feedback control calculates the vehicle stop maintenance torque Ts as a torque for correcting, for stopping the vehicle, excess or deficiency of the base torque To caused by a sloped road, a road surface resistance, and the like through the one-pedal feedback control.

As a result, the vehicle stop maintenance torque Ts can be a torque for the vehicle to match the road surface resistance of the flat road or the sloped road. The vehicle can thus smoothly be stopped when the vehicle is to be stopped, and the stop of the vehicle can be maintained.

Figure 3:
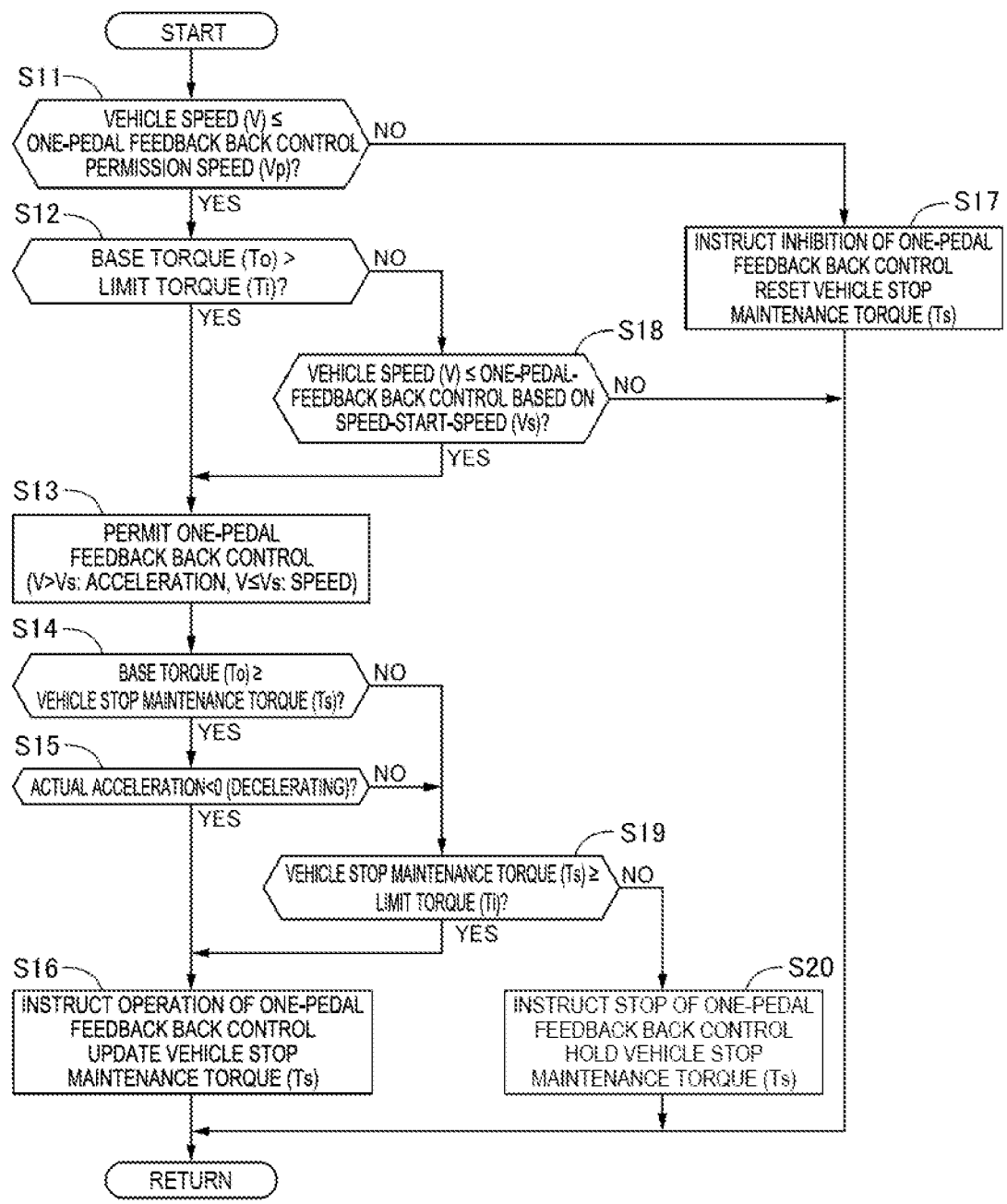
FIG. 3 is a flowchart for illustrating a flow of the one-pedal feedback control by a one-pedal feedback control execution determination unit 35 in the first embodiment.

FIG. 3 is a flowchart for illustrating a flow of the one-pedal feedback control by the one-pedal feedback control execution determination unit 35 in the first embodiment.

Execution based on this flowchart is repeated at predetermined calculation cycles.

In Step S11, the one-pedal feedback control execution determination unit 35 determines whether or not the speed. V of the vehicle is lower than a one-pedal feedback control permission speed Vp.

When the speed V of the vehicle is lower than the one-pedal feedback control permission speed Vp, the process proceeds to Step S12. When the speed V of the vehicle is not lower than the one-pedal feedback control permission speed Vp, the process proceeds to Step S17.

In Step S12, the one-pedal feedback control execution determination unit 35 determines whether or not the base torque To is eater than the limit torque Ti.

When the base torque To is greater than the limit torque Ti, the process proceeds to Step S13. When the base torque To is not greater than the limit torque Ti, the process proceeds to Step S18.

In Step S13, the one-pedal feedback control execution determination unit 35 permits the one-pedal feedback control such that the one-pedal feedback control based on the acceleration is executed while the speed V of the vehicle is higher than a one-pedal feedback control based on speed-start-speed. Vs, and the one-pedal feedback control based on the speed is executed when the speed V of the vehicle is equal to or lower than the one-pedal feedback control based on speed-start-speed Vs, and the process proceeds to Step S14.

In Step S14, the one-pedal feedback control execution determination unit 35 determines whether or not the base torque To is equal to or greater than the vehicle stop maintenance torque Ts.

When the base torque To is equal to or greater than the vehicle stop maintenance torque Ts, the process proceeds to Step S15. When the base torque To is not equal to or greater than the vehicle stop maintenance torque Ts, the process proceeds to Step S19.

In Step S15, the one-pedal feedback control execution determination unit 35 determines whether or not an actual acceleration is less than 0, that is, whether or not the vehicle is decelerating.

When the vehicle is decelerating, the process proceeds to Step S16. When the vehicle is not decelerating, the process proceeds to Step S19.

In Step S16, the one-pedal feedback control execution determination unit 35 instructs the operation of the one-pedal feedback control, and updates the vehicle stop maintenance torque Ts.

As a result, the vehicle stop maintenance torque Ts can be a torque more closely matching the road surface resistance of a flat road or a sloped road.

In Step S17, the one-pedal feedback control execution determination unit 35 instructs inhibition of the one-pedal feedback control, and resets the vehicle stop maintenance torque Ts.

As a result, a load on the control device can be reduced.

At this time, the one-pedal feedback torque Tt and the base torque To match each other.

In Step S18, the one-pedal feedback control execution determination unit 35 determines whether or not the speed V of the vehicle is equal to or lower than the one-pedal-feedback-control start speed Vs.

When the speed V of the vehicle is equal to or lower than the one-pedal-feedback-control start speed Vs, the process proceeds to Step S13. When the speed V of the vehicle is not equal to or lower than the one-pedal-feedback-control start speed. Vs, the one-pedal feedback control execution determination unit 35 finishes the control.

In Step S19, the one-pedal feedback control execution determination unit 35 determines whether or not the vehicle stop maintenance torque Ts is equal to or greater than the limit torque Ti.

When the vehicle stop maintenance torque Ts is equal to or greater than the limit torque Ti, the process proceeds to Step S16. When the vehicle stop maintenance torque Ts is not equal to or greater than the limit torque Ti, the process proceeds to Step S20.

In Step S20, the one-pedal feedback control execution determination unit 35 instructs the stop of the one-pedal feedback control in order to reduce the load on the control device, and maintains the vehicle stop maintenance torque Ts.

As a result, a smooth deceleration can be achieved by maintaining a constant deceleration down to the one-pedal feedback control based on speed-start-speed Vs in a low speed range through the one-pedal feedback control based on the acceleration. Moreover, the vehicle can reliably be decelerated until the vehicle stops through the one-pedal feedback control based on the speed from the one-pedal feedback control based on speed-start-speed Vs.

Figure 4:
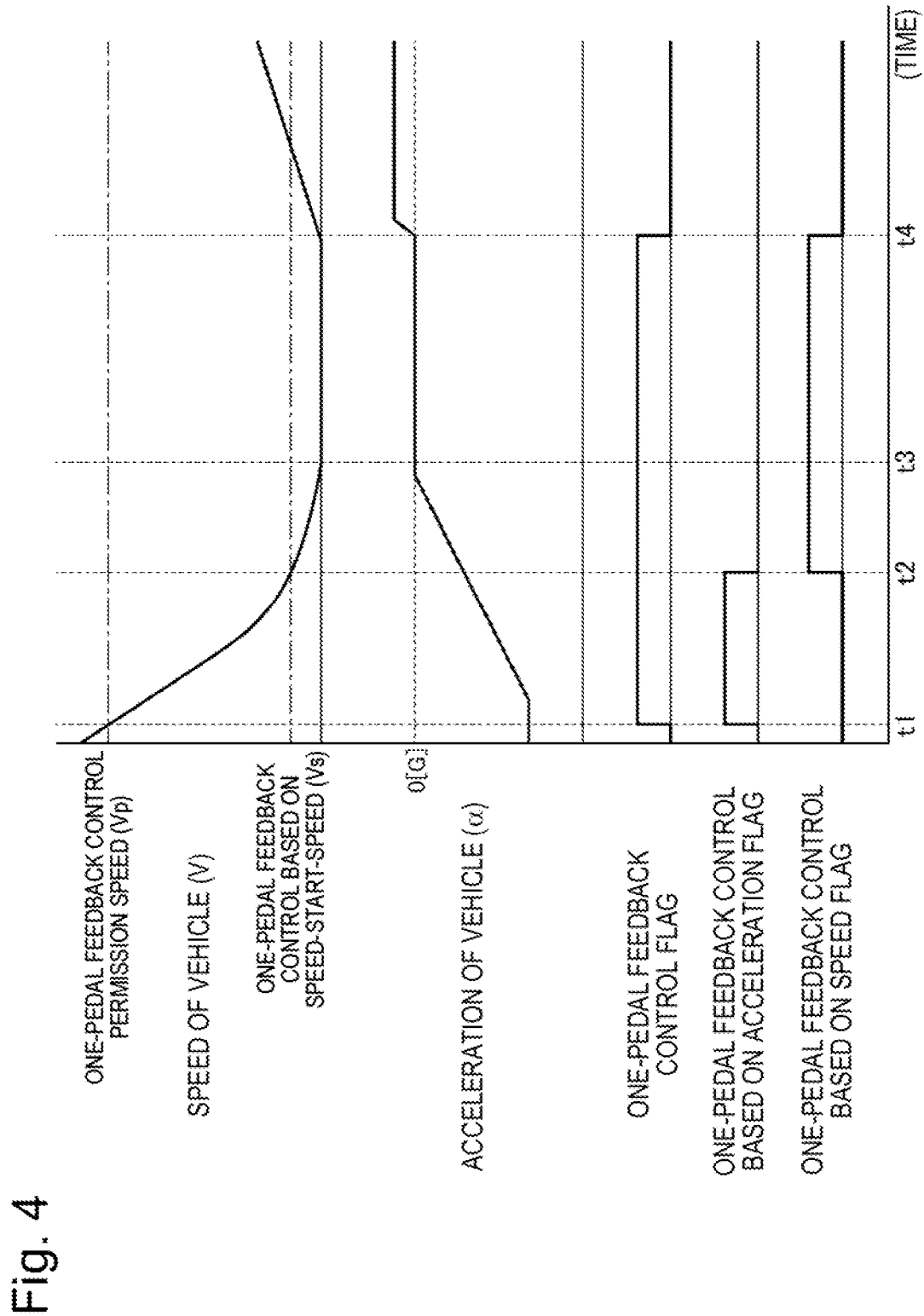
FIG. 4 is a time chart for illustrating the one-pedal feedback control by the one-pedal feedback control execution determination unit 35 in the first embodiment.

FIG. 4 is a time chart for illustrating the one-pedal feedback control by the one-pedal feedback control execution determination unit 35 in the first embodiment.

The vertical axis represents, from the top, a change in the speed V of the vehicle, a change in the acceleration α of the vehicle, a change in a one-pedal feedback control flag, a change in a one-pedal feedback control based on an acceleration flag, and a change in a one-pedal feedback control based on speed flag. The horizontal axis represents the time.

At a time t1, the speed V of the vehicle reaches the one-pedal feedback control permission speed Vp, the one-pedal feedback control flag and the one-pedal feedback control based on an acceleration flag are set, and the one-pedal feedback control based on the acceleration is started.

At a time t2, the speed V of the vehicle reaches the one-pedal feedback control based on speed-start-speed Vs, and the one-pedal feedback control based on an acceleration flag is reset. The one-pedal feedback control based on speed flag is set, and the one-pedal feedback control based on speed is started.

At a time t3, the vehicle stops, and the front motor 3 and the rear motor 7 are generating the vehicle stop maintenance torque Ts based on the requested distribution torque.

At a time t4, the one-pedal feedback control flag and the one-pedal feedback control based on speed flag are reset, and the vehicle starts.

Figure 5:
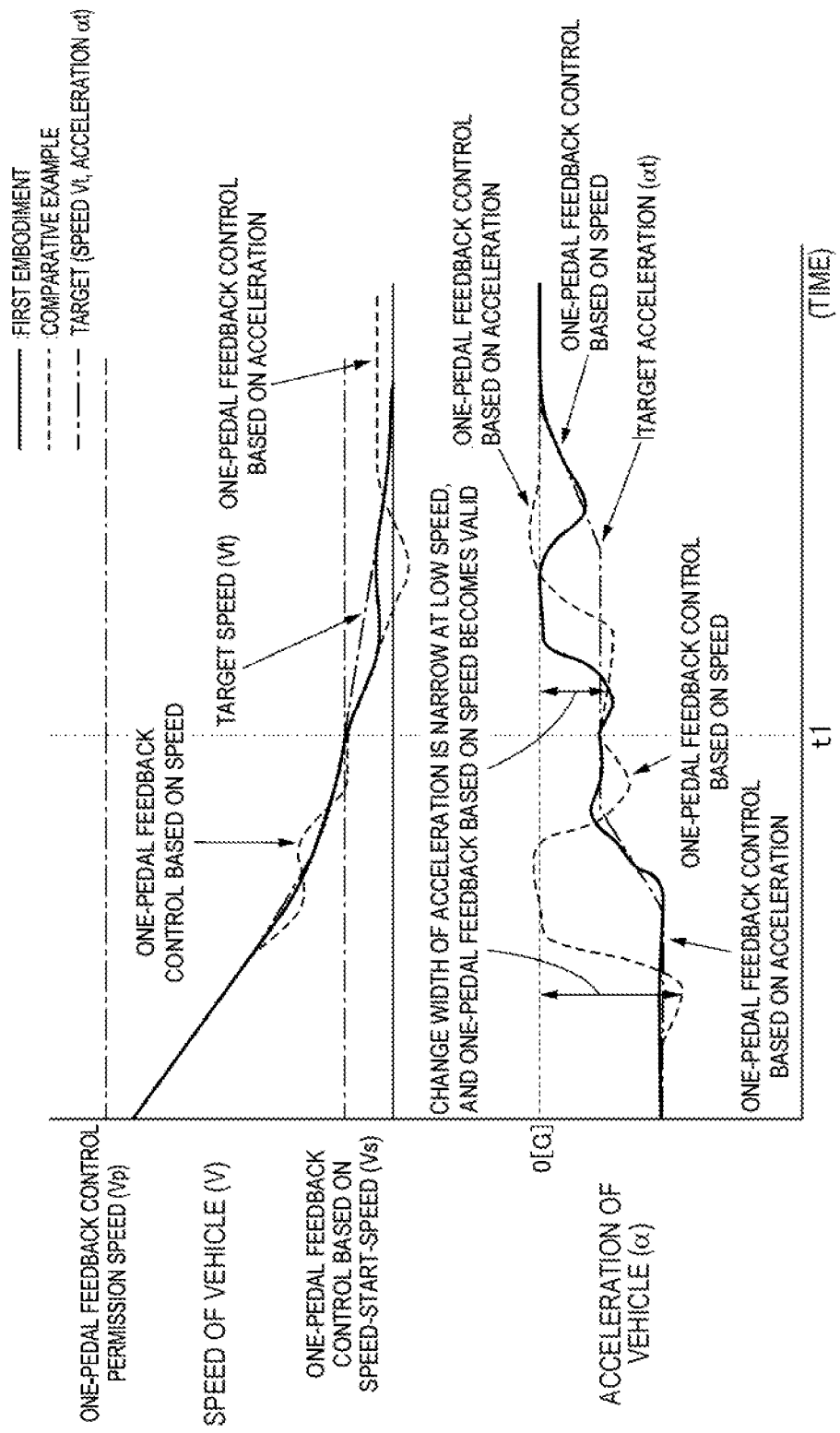
FIG. 5 is a time chart for illustrating a difference in the one-pedal feedback control between the first embodiment and a comparative example.

FIG. 5 is a time chart for illustrating a difference in the one-pedal feedback control between the first embodiment and a comparative example.

An upper side of the vertical axis represents the change in the speed V of the vehicle, and a lower side thereof represents the change in the acceleration r of the vehicle. The horizontal axis represents the time.

Moreover, solid lines represent the first embodiment, broken lines represent the comparative examples, and one-dot chain lines represent targets (speed Vt and acceleration αt).

In the first embodiment, the one-pedal feedback control based on the acceleration is executed until the estimated speed V of the vehicle falls below the one-pedal feedback control based on speed-start-speed. Vs. When the estimated speed V of the vehicle falls below the one-pedal feedback control based on speed-start-speed Vs at the time t1, the one-pedal feedback control based on the speed is executed.

Further, in the comparative example, the one-pedal feedback control based on the speed is executed until the estimated speed of the vehicle falls below the one-pedal feedback control based on speed-start-speed. Vs. When the estimated speed V of the vehicle falls below the one-pedal feedback control based on speed-start-speed Vs at the time t1, the one-pedal feedback control based on the speed acceleration is executed.

As a result, in the first embodiment, until the time t1 at which the estimated speed V of the vehicle falls below the one-pedal feedback control based on speed-start-speed. Vs, both of the speed V and the acceleration α change in substantially the same way as the target speed. Vt and the target acceleration αt. However, in the comparative example, the speed V and the acceleration α deviate from the target speed Vt and the target acceleration αt, respectively.

Moreover, in the first embodiment, when the estimated speed V of the vehicle falls below the one-pedal feedback control based on speed-start-speed Vs, the vehicle smoothly stops while following a speed that changes in substantially the same way as the target speed Vt. However, in the comparative example, the speed deviates from the target speed, and a distance to the stop of the vehicle also increases.

As described above, in the one-pedal feedback control based on the acceleration, the deceleration can be executed at a constant acceleration. Meanwhile, in the low speed range, the deceleration being a negative acceleration is reduced for the smooth stop of the vehicle, and the value itself of the acceleration is reduced. The torque control until the vehicle completely stops cannot thus be executed.

Meanwhile, in the one-pedal feedback control based on the speed, the target speed Vt can accurately be followed even through the negative acceleration, that is, the deceleration, fluctuates, and the vehicle can smoothly be stopped. However, the deceleration greatly fluctuates in a region in which the speed V of the vehicle is high, and ride comfort thus extremely decreases.

To deal with this problem, in the first embodiment, the one-pedal feedback control based on the acceleration is executed down to the one-pedal feedback control based on speed-start-speed Vs. The one-pedal feedback control based on the speed is executed when the speed V of the vehicle falls below the one-pedal feedback control based on speed-start-speed Vs. As a result, the vehicle can smoothly be stopped.

Figure 6:
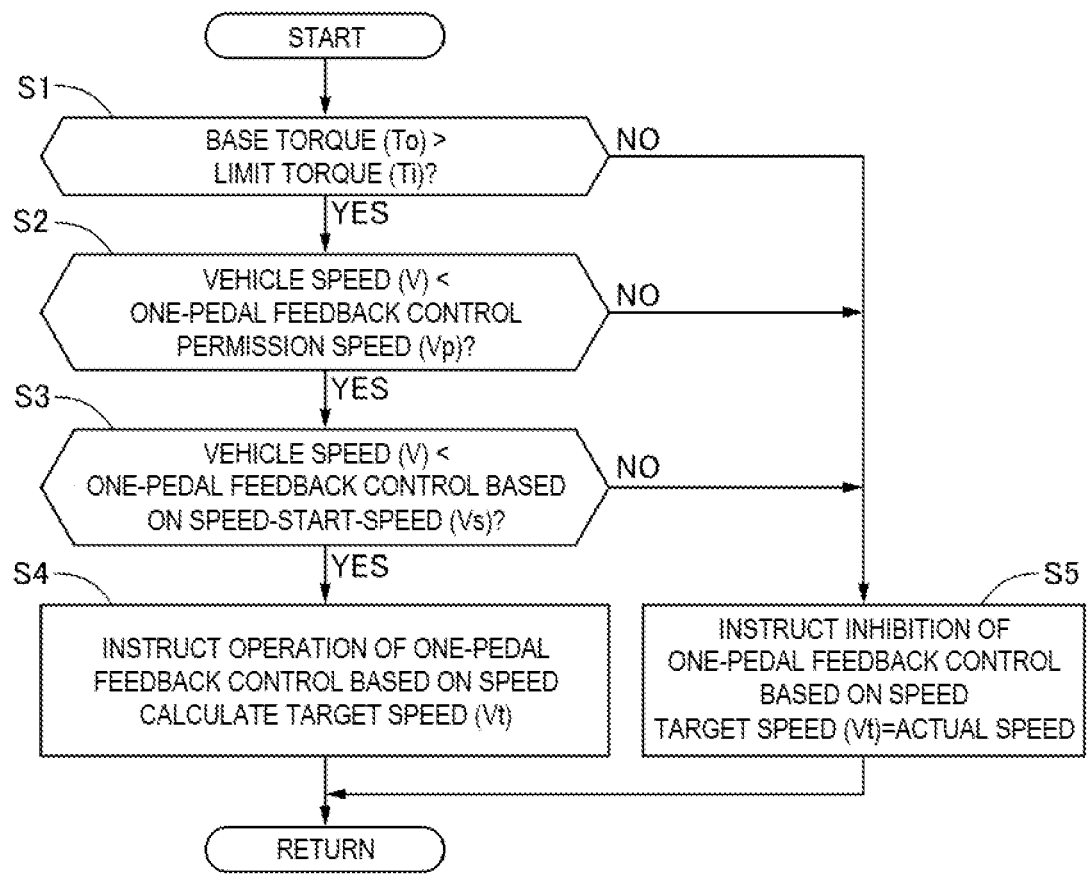
FIG. 6 is a flowchart for illustrating a flow of one-pedal feedback control based on the speed by a target speed calculation unit 37 in the first embodiment.

FIG. 6 is a flowchart for illustrating a flow of the one-pedal feedback control based on the speed by the target speed calculation unit 37 in the first embodiment.

Execution based on this flowchart is repeated at predetermined calculation cycles.

In Step S1, the target speed calculation unit 37 determines whether or not the base torque To is greater than the limit torque Ti.

When the base torque To is greater than the limit torque Ti, the process proceeds to Step S2. When the base torque To is not greater than the limit torque Ti, the process proceeds to Step S5.

In Step S2, the target speed calculation unit 37 determines whether or not the estimated speed V of the vehicle is lower than the one-pedal feedback control permission speed Vp.

When the estimated speed V of the vehicle is lower than the one-pedal feedback control permission speed Vp, the process proceeds to Step S3. When the estimated speed V of the vehicle is equal to or greater than the one-pedal feedback control permission speed Vp, the process proceeds to Step S5.

In Step S3, the target speed calculation unit 37 determines whether or not the estimated speed V of the vehicle is lower than the one-pedal feedback control based on speed-start-speed Vs.

When the estimated speed V of the vehicle is lower than the one-pedal feedback control start speed Vs, the process proceeds to Step S3. When the estimated speed V of the vehicle is equal to or greater than the one-pedal feedback control start speed Vs, the process proceeds to Step S5.

In Step S4, the target speed calculation unit 37 instructs the operation of the one-pedal feedback control based on the speed, and calculates the target speed Vt.

In Step S5, the target speed calculation unit 37 instructs the inhibition of the one-pedal feedback control based on the speed, and sets the target speed Vt to the estimated speed V of the vehicle.

Figure 7:
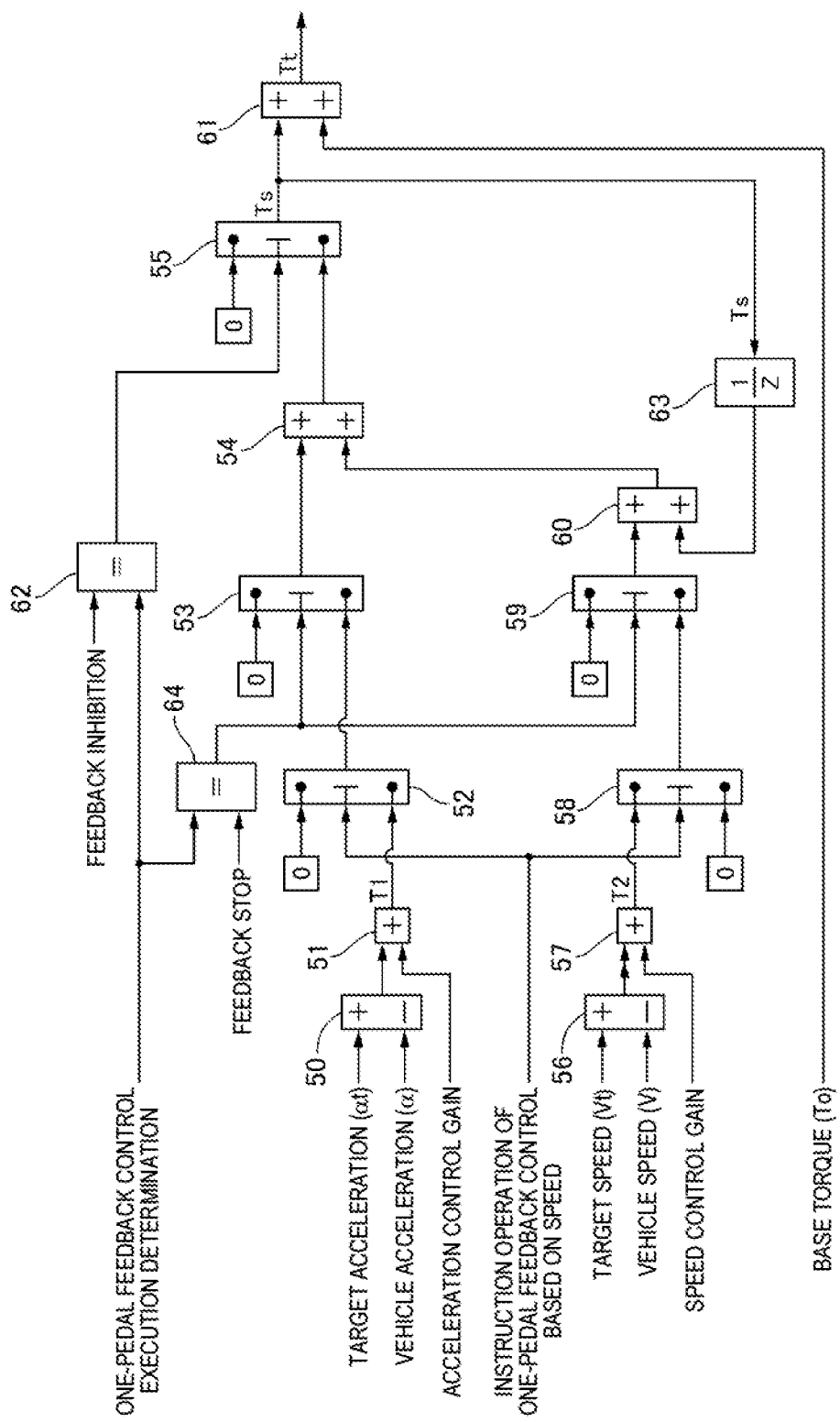
FIG. 7 is a block diagram for execution of control by a one-pedal feedback torque calculation unit 38 in the first embodiment.

FIG. 7 is a block diagram for execution of control by the one-pedal feedback torque calculation unit 38 in the first embodiment.

An acceleration deviation calculation unit 50 inputs the target acceleration αt calculated by the target acceleration calculation unit 36 and the estimated acceleration α of the vehicle calculated by the estimated vehicle acceleration calculation unit 31, calculates a deviation therebetween, and outputs the deviation information to a multiplication unit 51.

The multiplication unit 51 outputs, to an acceleration one-pedal feedback control execution determination unit 52, first torque information T1 (first command) obtained by multiplying the deviation, which is between the target acceleration αt and the estimated acceleration α of the vehicle, and is calculated by the acceleration deviation calculation unit 50, by an acceleration control gain.

The first torque information T1 (first command) is a torque for causing the acceleration c of the vehicle to follow the target acceleration αt.

The acceleration one-pedal feedback control execution determination unit 52 outputs the first torque information T1 (first command) output from the multiplication unit 51 to a one-pedal feedback control stop determination unit 53 when the inhibition instruction for the one-pedal feedback control based on the speed has been issued from the target speed calculation unit 37.

Further, The acceleration one-pedal feedback control execution determination unit 52 does not output the first torque information T1 (first command) output from the multiplication unit 51 to the one-pedal feedback control stop determination unit 53 when the operation instruction for the one-pedal feedback control based on the speed has been issued from the target speed calculation unit 37.

The one-pedal feedback control stop determination unit 53 does not output the first torque information T1 (first command) output from the multiplication unit 51 to an addition unit 54 when there has been issued the stop instruction for the one-pedal feedback control input from the one-pedal feedback control execution determination unit 35 through a matching determination unit 64.

Further, the one-pedal feedback control stop determination unit 53 outputs the first torque information T1 (first command) output from the multiplication unit 51 to the addition unit 54 when there has not been issued the stop instruction for the one-pedal feedback control input from the one-pedal feedback control execution determination unit 35 through the matching determination unit 64.

An speed deviation calculation unit 56 inputs the target speed Vt calculated by the target speed calculation unit 37 and the estimated speed V of the vehicle calculated by the estimated vehicle speed calculation unit 30, calculates a deviation therebetween, and outputs the deviation information to a multiplication unit 57.

The multiplication unit 57 outputs, to a one-pedal feedback control based on speed execution determination runt 58, second torque information T2 (second command) obtained by multiplying the deviation, which is between the target speed Vt and the estimated speed V of the vehicle, and is calculated by the speed deviation calculation unit 56, by a speed control gain.

The second torque information T2 (second command) is a torque for causing the speed V of the vehicle to follow the target speed Vt.

The one-pedal feedback control based on speed execution determination unit 58 does not output the second torque information 12 (second command) output from the multiplication unit 57 to a one-pedal feedback control stop determination unit 59 when the inhibition instruction for the one-pedal feedback control based on the speed has been issued from the one-pedal feedback control execution determination unit 35.

The one-pedal feedback control based on speed execution determination unit 58 outputs the second torque information T2 (second command) output from the multiplication unit 57 to the one-pedal feedback control stop determination unit 59 when the operation instruction for the one-pedal feedback control based on the speed has been issued from the one-pedal feedback control execution determination unit 35.

The one-pedal feedback control stop determination unit 59 does not output the second torque information T2 (second command) output from the multiplication unit 57 to an addition unit 60 when there has been issued the stop instruction for the one-pedal feedback control input from the one-pedal feedback control execution determination unit 35 through the matching determination unit 64.

The one-pedal feedback control stop determination unit 59 outputs the second torque information. T2 (second command) output from the multiplication unit 57 to the addition unit 60 when there has not been issued the stop instruction for the one-pedal feedback control input from the one-pedal feedback control execution determination unit 35 through the matching determination unit 64.

The addition unit 60 adds the vehicle stop maintenance torque Ts, which is described below, is output by a one-pedal feedback control torque calculation unit 55, and is input through an integrator 63, and the second torque information T2 (second command) output from the multiplication unit 57 to each other, and outputs a result thereof to the addition unit 54.

As a result, the vehicle stop maintenance torque Ts in a loop of the integrator 63 is increased and reduced through the one-pedal feedback control based on the acceleration and the one-pedal feedback control based on the speed, to thereby set the vehicle stop maintenance torque Ts in the loop of the integrator 63 to a value of a torque matching a road surface gradient until the vehicle stops.

Moreover, even when the vehicle is in the stop state, that is, in the state in which none of the one-pedal feedback control based on the acceleration and the one-pedal feedback control based on the speed are executed, the vehicle stop maintenance torque Ts is held and is output, and hence the stop state of the vehicle can reliably be maintained in any road state flat road, a sloped road, and the like).

Further, the vehicle stop maintenance torque Ts is still held until the speed V of the vehicle exceeds the one-pedal feedback control permission speed after the start (see FIG. 3), and it is thus possible to reduce a calculation period for the vehicle stop maintenance torque Ts when the vehicle stops again from a low speed. It is also possible to prevent a phenomenon that the vehicle unintentionally moves when the vehicle is being stopped.

The addition unit 54 adds the first torque information T1 (first command) output from the one-pedal feedback control stop determination unit 53 and the second torque information 12 (second command) output from the multiplication unit 60 to each other, and outputs a result thereof to the one-pedal feedback control inhibition determination unit 55.

In the first embodiment, the one-pedal feedback control based on the acceleration and the one-pedal feedback control based on the speed are switched based on the instruction from the one-pedal feedback control execution determination unit 35, and hence only any one piece of information (first command or second command) of the first torque information T1 (first command) output from the one-pedal feedback control stop determination unit 53 and the second torque information T2 (second command) output from the multiplication unit 60 is output to the one-pedal feedback control inhibition determination unit 55.

The one-pedal feedback control inhibition determination unit 55 does not output the torque information (first command or second command) output from the addition unit 54 to a one-pedal feedback torque output unit 61 when there has been issued the inhibition instruction for the one-pedal feedback control input from the one-pedal feedback control execution determination unit 35 through the matching determination unit 62.

Further, the one-pedal feedback control inhibition determination unit 55 outputs the torque information (first command or second command) output from the addition unit 54 to the one-pedal feedback torque output unit 61 when there has not been issued the inhibition instruction for the one-pedal feedback control input from the one-pedal feedback control execution determination unit 35 through the matching determination unit 62.

The one-pedal feedback torque output unit 61 outputs the one-pedal feedback torque Tt as the torque command obtained by adding the vehicle stop maintenance torque Ts output from the one-pedal feedback control inhibition determination unit 55 and the base torque To output from the base torque calculation unit 32 to each other to the front motor control device 18 and the rear motor control device 19 based on the requested distribution torque.

That is, the base torque To and the vehicle stop maintenance torque Ts, which is calculated through the one-pedal feedback control based on the acceleration or the one-pedal feedback control based on the speed, is increased and reduced until the vehicle stops, and serves as the correction torque, are added to each other, to thereby output the one-pedal feedback torque Tt as the torque command, and the vehicle stop maintenance torque Ts matching the road surface gradient is output when the vehicle is being stopped. Consequently, the smooth stop of the vehicle and the maintenance of the stop state of the vehicle can simultaneously be achieved.

Figure 8:
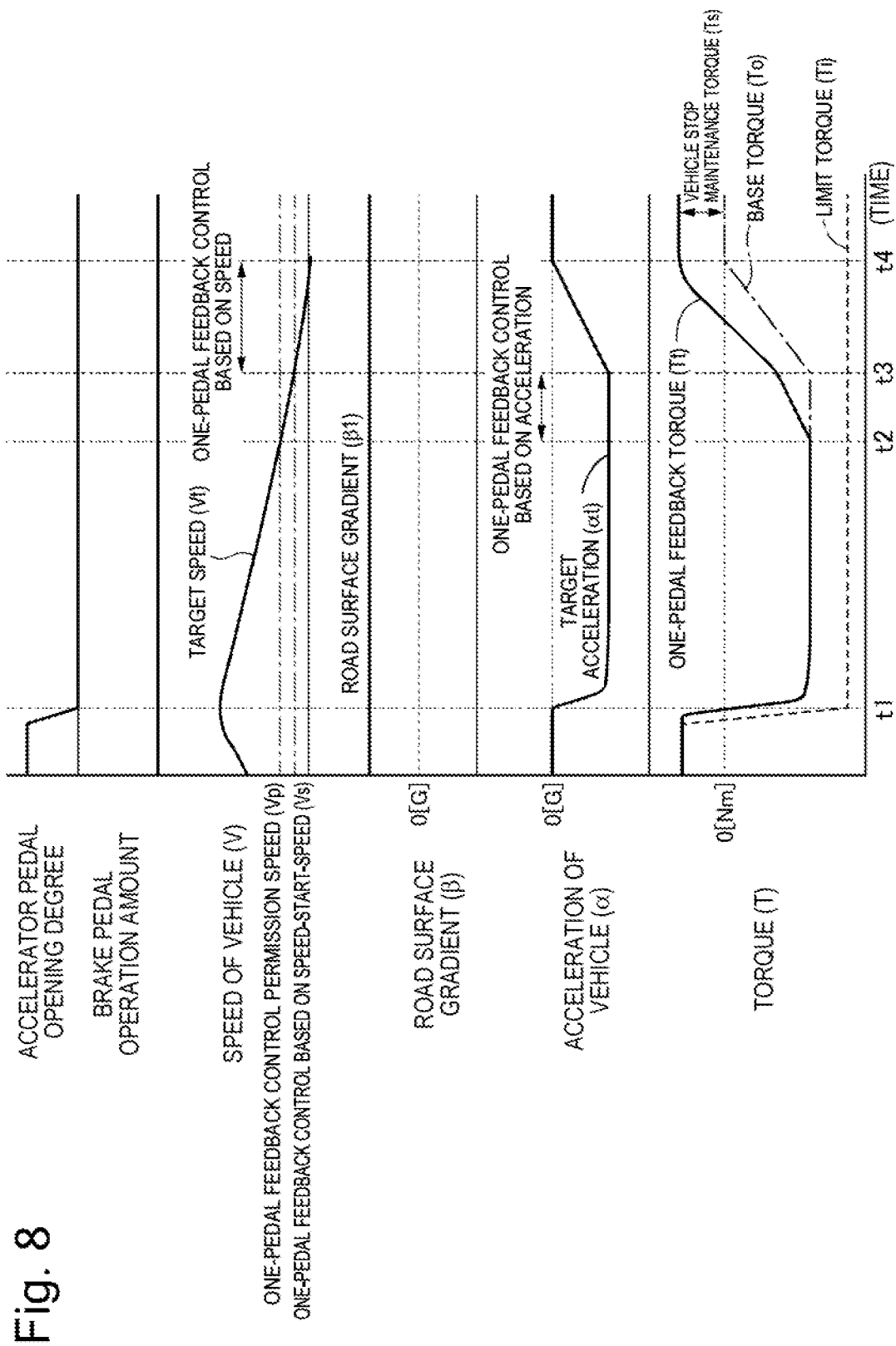
FIG. 8 is a time chart for illustrating a stop of the vehicle through the one-pedal feedback control on an uphill road in the first embodiment.

FIG. 8 is a time chart for illustrating a stop of the vehicle through the one-pedal feedback control on an uphill road in the first embodiment.

The vertical axis represents, from the top, a change in an accelerator pedal opening degree, a change in a brake pedal operation amount, the change in the speed V of the vehicle, a change in a road surface gradient $\beta$, the change in the acceleration $\alpha$ of the vehicle, and a change in a torque T of the vehicle. The horizontal axis represents the time.

At a time t1, the limit torque Ti and the base torque To are determined based on the speed V of the vehicle and the release amount of the accelerator pedal when an OFF operation of the accelerator pedal is executed by the driver.

In this state, the speed V of the vehicle is greater than the one-pedal feedback control permission speed Vp, and the one-pedal feedback control is inhibited, and hence the one-pedal feedback torque Tt has the same value as that of the base torque To.

After that, at a time t2, the speed V of the vehicle falls below the one-pedal feedback control permission speed Vp, the one-pedal feedback control based on the acceleration is started, the vehicle stop maintenance torque Ts is thus calculated, and the one-pedal feedback torque Tt consequently starts deviating from the base torque To.

That is, the acceleration α of the vehicle becomes lower than the target acceleration of for the uphill road, and the vehicle stop maintenance torque Ts thus increases.

Further, at a time t3, the speed V of the vehicle falls below the one-pedal feedback control based on speed-start-speed Vs. and the one-pedal feedback control based on the speed is thus started.

As a result, from the time t3 to a time t4, the base torque To starts increasing toward 0 based on the decrease in the speed V of the vehicle. The one-pedal feedback torque Tt also increases as the base torque To increases.

That is, the speed V of the vehicle becomes lower than the target speed Vt for the uphill road, and hence the vehicle stop maintenance torque Ts further increases.

At the time t4, the vehicle stops, the speed V of the vehicle becomes 0, and the vehicle stop maintenance torque Ts becomes a positive torque value based on a road surface gradient β1 of the uphill road.

As described above, the vehicle stop maintenance torque Ts is held, and the vehicle stop state can thus reliably be maintained also on the uphill road.

Figure 9:
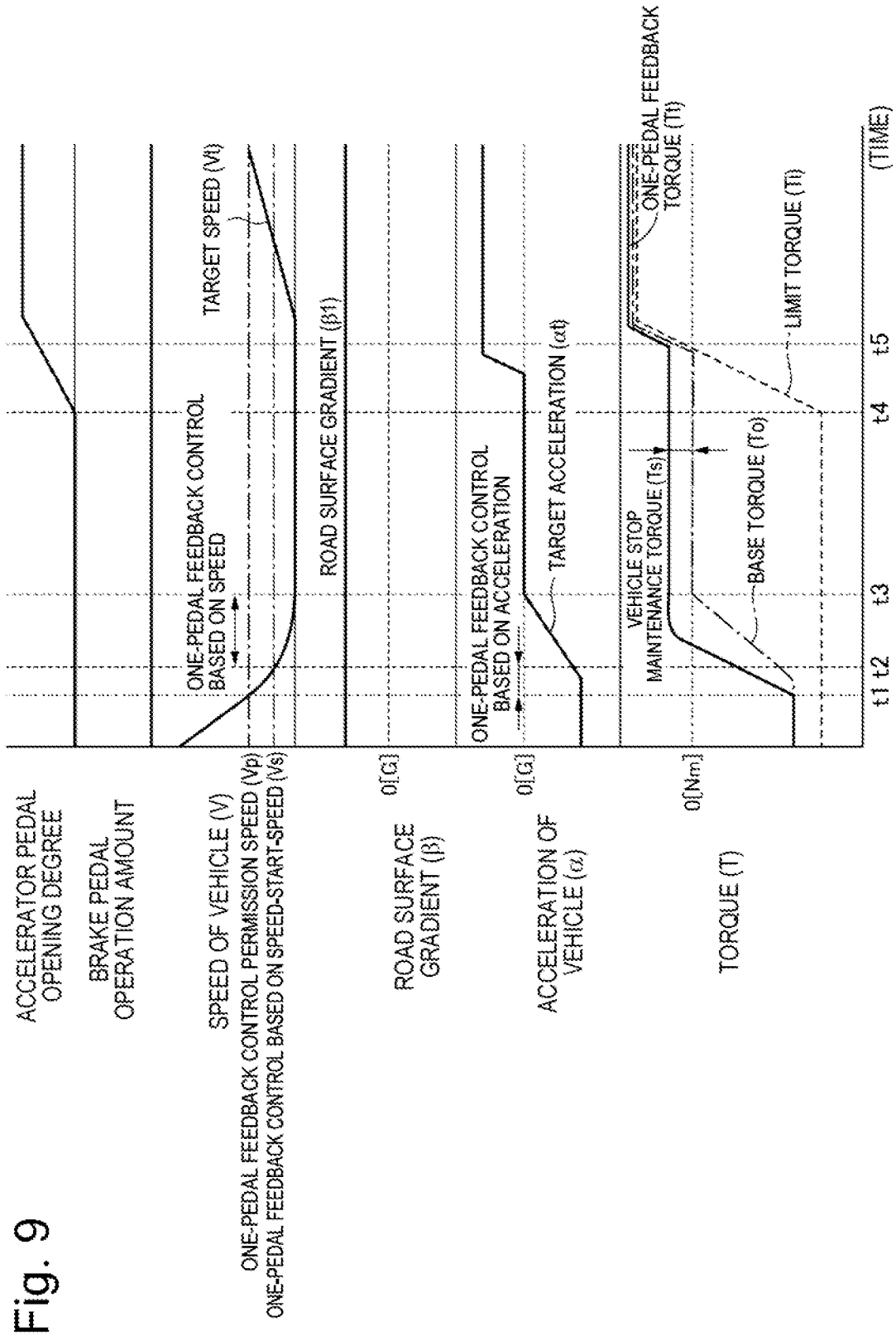
FIG. 9 is a time chart for illustrating a stop and a restart of the vehicle through the one-pedal feedback control on an uphill road in the first embodiment.

FIG. 9 is a time chart for illustrating a stop and a restart of the vehicle through the one-pedal feedback control on an uphill road in the first embodiment.

The vertical axis represents, from the top, a charge in an accelerator pedal opening degree, a change in a brake pedal operation amount, the change in the speed V of the vehicle, a change in a road surface gradient β, the change in the acceleration α of the vehicle, and a change in a torque T of the vehicle. The horizontal axis represents the time.

Under a state in which the vehicle is decelerating on an uphill road after the driver has already executed the OFF operation of the accelerator pedal, the speed V of the vehicle falls below the one-pedal feedback control per speed Vp at a time t1, the one-pedal feedback control based on the acceleration is started, the vehicle stop maintenance torque Ts is calculated, and the one-pedal feedback torque Tt thus starts deviating from the base torque To.

Further, at a time t2, the speed V of the vehicle falls below the one-pedal feedback control based on speed-start-speed Vs, the one-pedal feedback control based on the speed is thus started, and the vehicle stops at a time t3.

At the time t3, the vehicle stop maintenance torque Ts becomes a positive torque value based on the road surface gradient in of the uphill road.

From the time t3 to a time t4, the driver is not operating the accelerator pedal, and the vehicle stop maintenance torque Ts as the one-pedal feedback torque Tt is continued to be output, thereby maintaining the vehicle in the stop state.

The driver starts the operation of the accelerator pedal from the time t4, and the limit torque Ti thus starts increasing. However, the one-pedal feedback torque Tt as the torque command does not increase, and maintains the vehicle stop maintenance torque Ts until a time t5, and the vehicle maintains the stop state.

The limit torque Ti limits the one-pedal feedback torque Tt toward the plus direction at the time t5, the balance between the travel resistance caused by the road surface gradient β1 and a driving force of the vehicle is consequently lost, and the vehicle starts after the time t5.

As described above, when the vehicle restarts, the one-pedal feedback torque Tt is limited toward the increasing direction by the limit torque Ti, which changes based on the accelerator pedal opening degree.

As a result, the vehicle can smoothly be started and accelerated.

Moreover, even when the vehicle stops again from a low speed, the vehicle stop maintenance torque Ts is still held until the speed V of the vehicle exceeds the one-pedal feedback control permission speed Vp after the start.

As a result, it is possible to reduce the calculation period for the vehicle stop maintenance torque Ts when the vehicle stops again from a low speed, and it is also possible to prevent the phenomenon that the vehicle unintentionally moves when the vehicle is being stopped.

Figure 10:
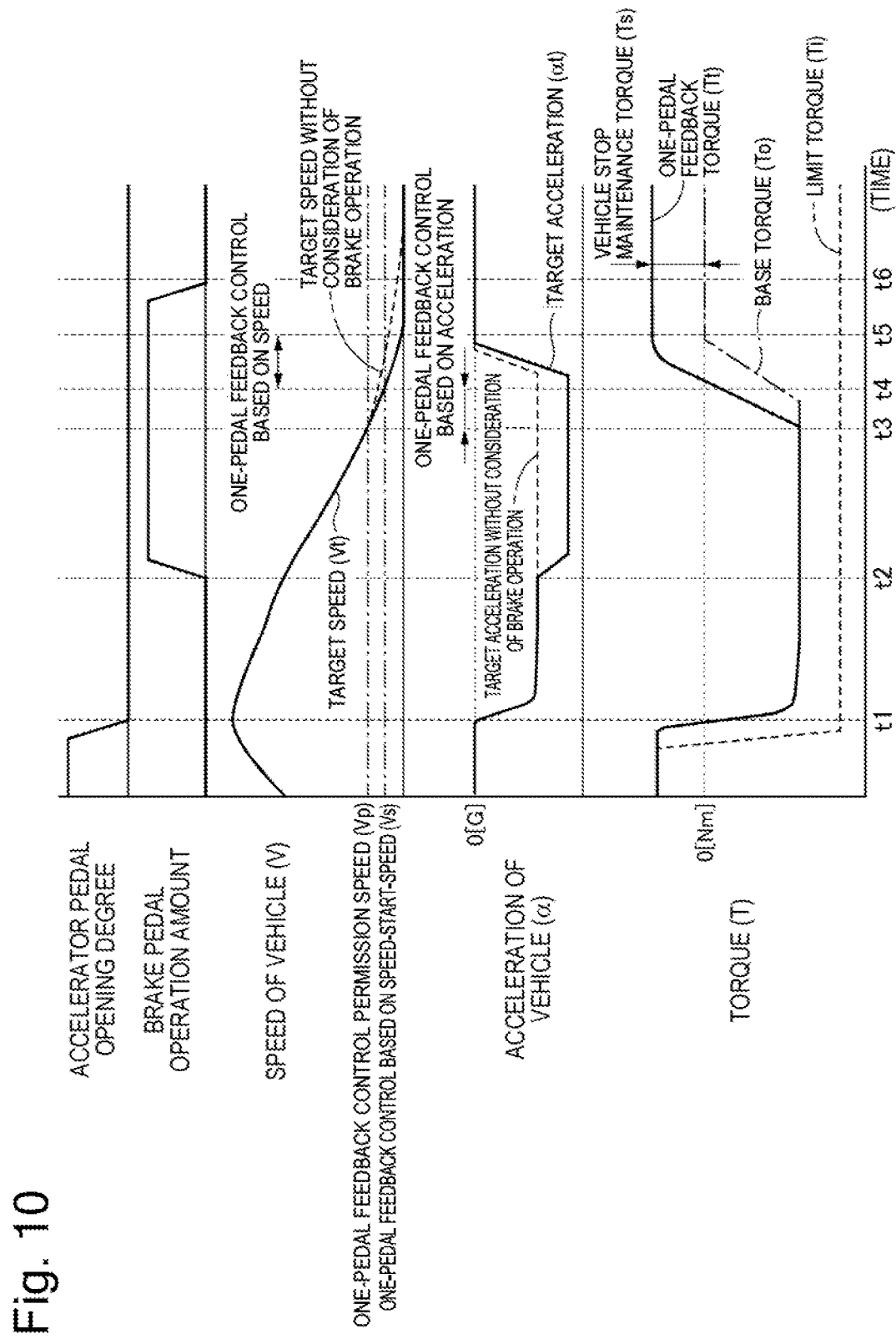
FIG. 10 is a time chart for illustrating a stop of the vehicle through the one-pedal feedback control when brakes are operated on an uphill road in the first embodiment.

FIG. 10 is a time chart for illustrating a stop of the vehicle through the one-pedal feedback control when brakes are operated on an uphill road in the first embodiment.

The vertical axis represents, from the top, a change in an accelerator pedal opening degree, a change in a brake pedal operation amount, the change in the speed V of the vehicle, the change in the acceleration α of the vehicle, and a change in a torque T of the vehicle. The horizontal axis represents the time.

At a time t1, the driver executes the OFF operation of the accelerator pedal, and the vehicle thus starts deceleration.

At a time t2, the driver starts the operation of the brake pedal, and the acceleration α of the vehicle also increases toward the negative direction. Under this state, the target acceleration αt is also increased toward the negative direction based on the operation of the brake pedal, and the speed V of the vehicle thus falls below the one-pedal feedback control permission speed Vp. Also when the one-pedal feedback control based on the acceleration is started from a time t3, the vehicle stop maintenance torque Ts based on the road surface state can be calculated as in the deceleration of the vehicle through the OFF operation of the accelerator pedal.

At a time t4, the speed V of the vehicle falls below the one-pedal feedback control based on speed-start-speed Vs, the one-pedal feedback control based on the speed is thus started, and the vehicle stops at a time t5.

As a result, even at a time to at which the driver stops the operation of the brake pedal, the one-pedal feedback torque Tt and the road surface resistance caused by the gradient match each other, the vehicle does not thus move forward or backward, and the vehicle maintains the stop state.

Description is now given of actions and effects.

The control device, the control method, and the control system for an electric vehicle according to the first embodiment provide actions and effects listed below.

(1) The one-pedal feedback control based on the acceleration is executed until the estimated speed V of the vehicle falls below the one-pedal feedback control based on speed-start-speed Vs. When the estimated speed V of the vehicle falls below the one-pedal feedback control based on speed-start-speed Vs, the one-pedal feedback control based on the speed is executed.

As a result, a smooth deceleration can be achieved by maintaining a constant deceleration down to the one-pedal feedback control based on speed-start-speed Vs in a low speed range through the one-pedal feedback control based on the acceleration. Moreover, the vehicle can reliably be decelerated until the vehicle stops through the one-pedal feedback control based on the speed from the one-pedal feedback control based on speed-start-speed Vs.

(2) The target speed of the one-pedal feedback control based on the speed is obtained from the target acceleration.

As a result, it is possible to achieve a smooth stop of the vehicle based on a stable negative acceleration.

(3) The one-pedal feedback torque calculation unit 38 is configured to operate when the speed V of the vehicle is lower than the one-pedal feedback control permission speed Vp, add the vehicle stop maintenance torque Ts, which serves as the correction torque, and is increased and reduced through the one-pedal feedback control based on the acceleration or the speed until the vehicle stops, to the base torque To for each of the electric motors 3 and 7, which serves as the reference of the one-pedal feedback control, and is obtained based on the accelerator pedal operation amount information on the release of the accelerator pedal acquired from the accelerator pedal sensor 22 configured to detect the stroke of the accelerator pedal and the speed of the vehicle V. and to output the one-pedal feedback torque Tt as the command torque.

As a result, whether the road is a flat road or a sloped road, the vehicle can smoothly be stopped when the vehicle is to be stopped.

(4) The one-pedal feedback torque calculation unit 38 is configured to set the vehicle stop maintenance torque Ts to the torque matching the road surface resistance of a flat road or a sloped road until the vehicle stops.

As a result, whether the road is a flat road or a sloped road, the vehicle can smoothly be stopped when the vehicle is to be stopped.

(5) The one-pedal feedback torque calculation unit 38 is configured to execute the one-pedal feedback control, to thereby update the vehicle stop maintenance torque Ts when the base torque To is equal to or greater than the vehicle stop maintenance torque Ts, and the vehicle is decelerating (negative acceleration).

As a result, the vehicle stop maintenance torque Ts can be a torque more closely matching the road surface resistance of a flat road or a sloped road.

(6) The one-pedal feedback torque calculation unit 38 is configured to stop the one-pedal feedback control, and holds the vehicle stop maintenance torque Ts when the vehicle stop maintenance torque Ts is lower than the limit torque Ti calculated by the limit torque calculation unit 33.

As a result, a load on the control device can be reduced.

(7) The one-pedal feedback torque calculation unit 38 is configured to reset the vehicle stop maintenance torque Ts, and to inhibit the one-pedal feedback control when the speed V of the vehicle is greater than the one-pedal feedback control permission speed Vp.

As a result, a load on the control device can be reduced.

(8) After the one-pedal feedback torque calculation unit 38 inhibits the one-pedal feedback control, the one-pedal feedback torque Tt is set so as to match the base torque To when the speed V of the vehicle falls below the one-pedal feedback control permission speed. Vp.

Thus, the vehicle executes the one-pedal feedback control based on the road surface state during the travel, and the vehicle stop maintenance torque Ts can thus be an optimal value.

(2) The limit torque calculation unit 33 is configured to obtain the limit torque Ti as the minimum value of the one-pedal feedback torque Tt based on the accelerator pedal operation information on the release of the accelerator pedal and the speed V of the vehicle.

Thus, the durability of the front motor 3 and the rear motor 7 can be enhanced.

(10) The base torque To is set to a torque at the time when the vehicle stops on a flat road.

As a result, it is possible to more smoothly stop the vehicle also when the vehicle is to be stopped on a sloped road by adding the vehicle stop maintenance torque Ts obtained through the one-pedal feedback control to the base torque To.

(11) The brake deceleration estimation unit 40 is configured to obtain the deceleration based on the brake operation of the driver, to thereby correct the one-pedal feedback torque Tt.

As a result, also when the driver executes the brake operation, the vehicle can smoothly be stopped.

(12) The vehicle stop maintenance torque Ts is still held until the speed V of the vehicle exceeds the one-pedal feedback control permission speed Vp after the start.

As a result, it is possible to reduce the calculation period for the vehicle stop maintenance torque Ts when the vehicle stops again from a low speed, and it is also possible to prevent the phenomenon that the vehicle unintentionally moves when the vehicle is being stopped.

(13) When the vehicle restarts, the one-pedal feedback torque Tt is limited toward the increasing direction by the limit torque Ti, which changes based on the accelerator pedal opening degree.

As a result, the vehicle can smoothly be started and accelerated.

Other Embodiments

The embodiment of the present invention has been described above. However, the specific configuration of the present invention is not limited to the configuration described in the embodiment. A modification in design without departing from the scope of the gist of the invention is also encompassed in the present invention.

For example, in this embodiment, the one-pedal feedback control based on the acceleration and the one-pedal feedback control based on the speed are switched based on the speed of the vehicle, however, one piece of control may be set to main control, and another piece of control may be set to auxiliary control, that is, both pieces of control may be merged.

Moreover, in this embodiment, the speed of the vehicle is calculated from the rotation number information on the front wheel resolver 12 configured to detect the motor rotation number of the front motor 3 and the rear wheel resolver 13 configured to detect the motor rotation number of the rear motor 7, but the speed of the vehicle may be calculated from the wheel speed sensors 11.

Description is now given of technical ideas that may be understood from the embodiments described above.

According to one aspect, of the present invention, provided is a control device for an electric vehicle, the electric vehicle including an electric motor configured to apply a regenerative braking force to a wheel of a vehicle, wherein the control device is configured to: acquire a speed of the vehicle, obtain a first command for causing an acceleration of the vehicle to follow a target acceleration obtained based on operation amount information on a release of an accelerator pedal of the vehicle acquired from an accelerator pedal sensor configured to detect a physical quantity relating to a stroke of the accelerator pedal; obtain a second command for causing the speed of the vehicle to follow a target speed when a value of the speed of the vehicle lower than a predetermined speed is input to the control device; and output, to the electric motor, a torque command obtained from the first command and the second command.

According to a more preferred aspect of the present invention, in the above-mentioned aspect, the control device is configured to: obtain the acceleration of the vehicle from the speed of the vehicle; and obtain the target speed from the target acceleration.

Another preferred aspect includes the one-pedal feedback torque calculation unit, the limit torque calculation unit, and the brake deceleration estimation un it in any one of the above-mentioned aspects.

According to a more preferred aspect of the present invention, in the above-mentioned aspect, the one-pedal feedback torque calculation unit is configured to: operate when the speed of the vehicle is lower than a one-pedal feedback control permission speed; and add a vehicle stop maintenance torque obtained from the first command and the second command to a base torque obtained based on a signal relating to the release of the accelerator pedal and the speed of the vehicle to obtain a one-pedal feedback torque, to thereby output, to the electric motor, the one-pedal feedback torque as the torque command.

According to another preferred aspect of the present invention, in any one of the above-mentioned aspects, the one-pedal feedback torque calculation unit is configured to execute one-pedal feedback control when the base torque is equal to or greater than the vehicle stop maintenance torque, and the vehicle is decelerating, to thereby update the vehicle stop maintenance torque.

According to yet another preferred aspect of the present invention, in any one of the above-mentioned aspects, the one-pedal feedback torque calculation unit is configured to stop the one-pedal feedback control when the vehicle stop maintenance torque is lower than a limit torque of the electric motor calculated by the limit torque calculation unit, and to hold the vehicle stop maintenance torque.

According to yet another preferred aspect of the present invention, in any one of the above-mentioned aspects, the one-pedal feedback torque calculation unit is configured to reset the vehicle stop maintenance torque when the speed of the vehicle is greater than the one-pedal feedback control permission speed, and to inhibit one-pedal feedback control.

According to yet another preferred aspect of the present invention, in any one of the above-mentioned aspects, the one-pedal feedback torque matches the base torque.

According to yet another preferred aspect of the present invention, in any one of the above-mentioned aspects, the limit torque calculation unit is configured to obtain a limit torque based on operation amount information on the release of the accelerator pedal and the speed of the vehicle.

According to yet another preferred aspect of the present invention, in any one of the above-mentioned aspects, the base torque is a torque at a time when the vehicle stops on a flat road.

According to yet another preferred aspect of the present invention, in any one of the above-mentioned aspects, the brake deceleration estimation unit is configured to obtain a deceleration corresponding to a brake operation, to thereby correct the torque command.

Further, from the other viewpoint, according to one aspect of the present invention, there is provided a control method for an electric vehicle, the electric vehicle including an electric motor configured to apply a regenerative braking force to a wheel of a vehicle, the control method including: acquiring a speed of the vehicle; obtaining an acceleration of the vehicle based on the acquired speed of the vehicle; obtaining a first command for causing the acceleration of the vehicle to follow a target acceleration obtained based on operation amount information on a release of an accelerator pedal of the vehicle acquired from an accelerator pedal sensor configured to detect a physical quantity relating to a stroke of the accelerator pedal; obtaining a second command for causing the speed of the vehicle to follow a target speed when a value of the speed of the vehicle lower than a predetermined speed is input to the control device, and outputting, to the electric motor, a torque command obtained from the first command and the second command.

Further, from the yet other viewpoint, there is provided a control system for an electric vehicle, the control system including: an electric motor configured to apply a regenerative braking force to a wheel of a vehicle; an accelerator pedal sensor configured to detect a physical quantity relating to a stroke of an accelerator pedal of the vehicle; and a control unit configured to control the electric motor,
wherein the control unit is configured to: acquire a speed of the vehicle; obtain an acceleration of the vehicle based on the acquired speed of the vehicle; obtain a first command for causing the acceleration of the vehicle to follow a target acceleration obtained based on a signal relating to a release of the accelerator pedal acquired from the accelerator pedal sensor; obtain a second command for causing the speed of the vehicle to follow a target speed when a value of the speed of the vehicle lower than a predetermined speed is input; and output, to the electric motor, a torque command obtained from the first command and the second command.

Note that, the present invention is not limited to the above-mentioned embodiment, and includes further various modification examples. For example, in the above-mentioned embodiment, the configurations are described in detail in order to clearly describe the present invention, but the present invention is not necessarily limited to an embodiment that includes all the configurations that have been described. Further, a part of the configuration of a given embodiment can replace the configuration of another embodiment, and the configuration of another embodiment can also be added to the configuration of a given embodiment. Further, another configuration can be added to, deleted from, and replace a part of the configuration of each of the embodiments.

The present application claims a priority based on Japanese Patent Application No. 2019-012994 filed on Jan. 29, 2019. All disclosed contents including Specification, Scope of Claims, Drawings, and Abstract of Japanese Patent Application No. 2019-012994 filed on Jan. 29, 2019 are incorporated herein by reference in their entirety.

REFERENCE SIGNS LIST

1 electric vehicle, 3 front motor (electric motor for front wheels), 7 rear motor (electric motor for rear wheels), 12 front wheel resolver (vehicle speed sensor), 13 rear wheel resolver (vehicle speed sensor), 17 vehicle control device, 22 accelerator pedal sensor, 33 limit torque calculation unit, 38 one-pedal feedback torque calculation unit (control unit), 40 brake deceleration estimation unit, T1 first torque information (first command), T2 second torque information (second command), Ti limit torque, To base torque, Ts vehicle stop maintenance torque, Tt one-pedal feedback torque (torque command), V speed of vehicle, Vp one-pedal feedback control permission speed, Vs one-pedal feedback control based on speed-start-speed, Vt target speed, α acceleration, αt target acceleration.

The invention claimed is:
1. An apparatus comprising:
a control device of an electric vehicle, the electric vehicle comprising an electric motor configured to apply a regenerative braking force to a wheel of a vehicle, the control device comprising a one-pedal feedback torque calculation unit,
wherein the control device is configured to:
acquire a speed of the vehicle;
when the speed of the vehicle falls below a one-pedal feedback control permission speed (Vp), obtain a first command (T1) configured to cause an acceleration of the vehicle to follow a target acceleration obtained based on operation amount information on a release of an accelerator pedal of the vehicle acquired from an accelerator pedal sensor configured to detect a physical quantity relating to a stroke of the accelerator pedal;
obtain a second command (T2) configured to cause the speed of the vehicle to follow a target speed when a value of the speed of the vehicle being input to the control device falls below a one-pedal feedback control based on speed-start-speed (Vs); and
output to the electric motor: a torque command obtained from the first command (T1) when the speed of the vehicle falls below the one-pedal feedback control permission speed (Vp) until the speed of the vehicle reaches one-pedal feedback control based on speed-start-speed (Vs); and a torque command obtained from the second command (T2) when the speed of the vehicle falls below one-pedal feedback control based on speed-start-speed (Vs),
wherein the one-pedal feedback torque calculation unit is configured to:
operate when the speed of the vehicle is lower than a one-pedal feedback control permission speed (Vp); and
add a vehicle stop maintenance torque obtained from the first command and the second command (T2) to a base torque obtained based on a signal relating to the release of the accelerator pedal and the speed of the vehicle to obtain a one-pedal feedback torque, to thereby output, to the electric motor, the one-pedal feedback torque as the torque command.

2. The apparatus according to claim 1,
wherein the control device is configured to:
obtain the acceleration of the vehicle from the speed of the vehicle; and
obtain the target speed from the target acceleration.

3. The apparatus according to claim 1, wherein the one-pedal feedback torque calculation unit is configured to execute one-pedal feedback control, when the base torque is equal to or greater than the vehicle stop maintenance torque and the vehicle is decelerating, and to update the vehicle stop maintenance torque.

4. The apparatus according to claim 1, further comprising a limit torque calculation unit,
wherein the one-pedal feedback torque calculation unit is configured to stop the one-pedal feedback control when the vehicle stop maintenance torque is lower than a limit torque of the electric motor calculated by the limit torque calculation unit, and to hold the vehicle stop maintenance torque.

5. The apparatus according to claim 1, wherein the one-pedal feedback torque calculation unit is configured to reset the vehicle stop maintenance torque when the speed of the vehicle is greater than the one-pedal feedback control permission speed (Vp), and to inhibit the one-pedal feedback control.

6. The apparatus according to claim 5, wherein the one-pedal feedback torque matches the base torque.

7. The apparatus according to claim 1, further comprising a limit torque calculation unit,
wherein the limit torque calculation unit is configured to obtain a limit torque based on operation amount information on the release of the accelerator pedal and the speed of the vehicle.

8. The apparatus according to claim 1, wherein the base torque is a torque at a time when the vehicle stops on a flat road.

9. The apparatus according to claim 1, further comprising a brake deceleration estimation unit,
wherein the brake deceleration estimation unit is configured to obtain a deceleration corresponding to a brake operation, and to correct the torque command.

10. A control method for an electric vehicle, the electric vehicle comprising an electric motor configured to apply a regenerative braking force to a wheel of a vehicle,
using a vehicle control device mounted on the electric vehicle, the control method comprising:
acquiring a speed of the vehicle;
obtaining an acceleration of the vehicle based on the acquired speed of the vehicle;
when the speed of the vehicle (1) falls below a one-pedal feedback control permission speed (Vp), obtaining a first command (T1) configured to cause the acceleration of the vehicle to follow a target acceleration obtained based on operation amount information on a release of an accelerator pedal of the vehicle (1) acquired from an accelerator pedal sensor configured to detect a physical quantity relating to a stroke of the accelerator pedal;
obtaining a second command (T2) configured to cause the speed of the vehicle to follow a target speed when a value of the speed of the vehicle lower than a predetermined speed is input to the control device, and
outputting to the electric motor: a torque command obtained from the first command (T1) when the speed of the vehicle falls below the one-pedal feedback control permission speed (Vp) until the speed of the vehicle reaches one-pedal feedback control based on speed-start-speed (Vs); and a torque command obtained from the second command (T2) when the speed of the vehicle falls below one-pedal feedback control based on speed-start-speed (Vs)
wherein the one-pedal feedback torque calculation unit is configured to:
operate when the speed of the vehicle is lower than a one-pedal feedback control permission speed (Vp); and
add a vehicle stop maintenance torque obtained from the first command (T1) and the second command (T2) to a base torque obtained based on a signal relating to the release of the accelerator pedal and the speed of the vehicle to obtain a one-pedal feedback torque, to thereby output, to the electric motor, the one-pedal feedback torque as the torque command.

11. A control system for an electric vehicle, the control system comprising:
an electric motor configured to apply a regenerative braking force to a wheel of a vehicle;
an accelerator pedal sensor configured to detect a physical quantity relating to a stroke of an accelerator pedal of the vehicle; and
a control unit configured to control the electric motor,
wherein the control unit is configured to:
acquire a speed of the vehicle;
when the speed of the vehicle falls below a one-pedal feedback control permission speed (Vp), obtain an acceleration of the vehicle based on the acquired speed of the vehicle;
obtain a first command (T1) configured to cause the acceleration of the vehicle to follow a target acceleration obtained based on a signal relating to a release of the accelerator pedal acquired from the accelerator pedal sensor;
obtain a second command (T2) configured to cause the speed of the vehicle to follow a target speed when a value of the speed of the vehicle lower than a one-pedal feedback control based on speed-start-speed (Vs) is input; and
output to the electric motor: a torque command obtained from the first command (T1) when the speed of the vehicle falls below the one-pedal feedback control permission speed (Vp) until the speed of the vehicle reaches one-pedal feedback control based on speed-start-speed (Vs); and a torque command obtained from the second command (T2) when the speed of the vehicle falls below one-pedal feedback control based on speed-start-speed (Vs)
wherein the one-pedal feedback torque calculation unit is configured to:
operate when the speed of the vehicle is lower than a one-pedal feedback control permission speed (Vp); and
add a vehicle stop maintenance torque obtained from the first command (T1) and the second command (T2) to a base torque obtained based on a signal relating to the release of the accelerator pedal and the speed of the vehicle to obtain a one-pedal feedback torque, to thereby output, to the electric motor, the one-pedal feedback torque as the torque command.

* * * * *